United States Patent

[11] 3,612,229

[72] Inventors Richard Thomas Fowler;
Charles Newstead, both of Birmingham, England
[21] Appl. No. 847,951
[22] Filed Aug. 6, 1969
[45] Patented Oct. 12, 1971
[73] Assignee Girling Limited
[32] Priority Nov. 5, 1968
[33] Great Britain
[31] 52,304/68

[54] VEHICLE BRAKING SYSTEMS
11 Claims, 5 Drawing Figs.
[52] U.S. Cl. .................................................. 188/170, 303/9
[51] Int. Cl. ................................................... F16d 65/24
[50] Field of Search .......................................... 188/170, 106 P; 303/2, 9, 13

[56] References Cited
UNITED STATES PATENTS
2,810,458  10/1957  Troxell ....................... 188/170 X
3,095,067  6/1963  Murty et al. .................. 188/170
FOREIGN PATENTS
258,148  11/1967  Austria ........................ 188/170

Primary Examiner—Duane A. Reger
Attorney—Scrivener, Parker, Scrivener and Clarke ABSTRACT: This invention relates to a vehicle drum brake actuator unit comprising a pair of elongate connecting members for attachment one to each of the drum brakes at opposite sides of the vehicle, spring means preferably in coil form for biasing each member in a direction along its length to tend to apply its respective drum brake, and a piston and cylinder assembly operable when fluid under pressure is applied thereto to prevent brake actuation and operable when the fluid pressure is released therefrom to allow the spring means to bias the members in said direction to actuate their respective drum brakes.

VEHICLE BRAKING SYSTEMS

This invention relates to vehicle braking systems and to mechanical-actuating means therefor.

Vehicle drum brakes are known in which a shoe expander device is actuated by a spring, whose force is normally resisted by a liquid pressure, so that when the pressure is released, the spring operates the expander to apply the brakeshoes. This release of pressure takes place in response to actuation of a flow control valve by the driver applying the handbrake or footbrake, or when the vehicle engine stops, or when the hydraulic system fails.

In the known systems of which we are aware in this general class, each wheel brake has its own spring and cooperating hydraulic arrangement, and the actuator unit as a whole tends to consume space in an already overcrowded region. Furthermore, the actuator units on opposite sides of the vehicle may apply different braking effects, due to unequal wear of brake linings on the respective wheel brakes.

In accordance with the present invention, these disadvantages are removed by the provision of a vehicle drum brake actuator unit comprising a pair of elongate connecting members for attachment one to each of the drum brakes at opposite sides of the vehicle, spring means for biasing each member in a direction along its length to tend to apply its respective drum brake, and a piston and cylinder assembly operable when fluid under pressure is applied thereto to prevent brake actuation and operable when the fluid pressure is released therefrom to allow the spring means to bias the members in said direction to actuate their respective drum brakes. This simple arrangement makes it possible to position the unit away from the wheels in question, e.g. centrally of the vehicle.

Embodiments of the present invention will now be described by way of example only, with reference to the accompanying drawings, in which.

Figure 1:
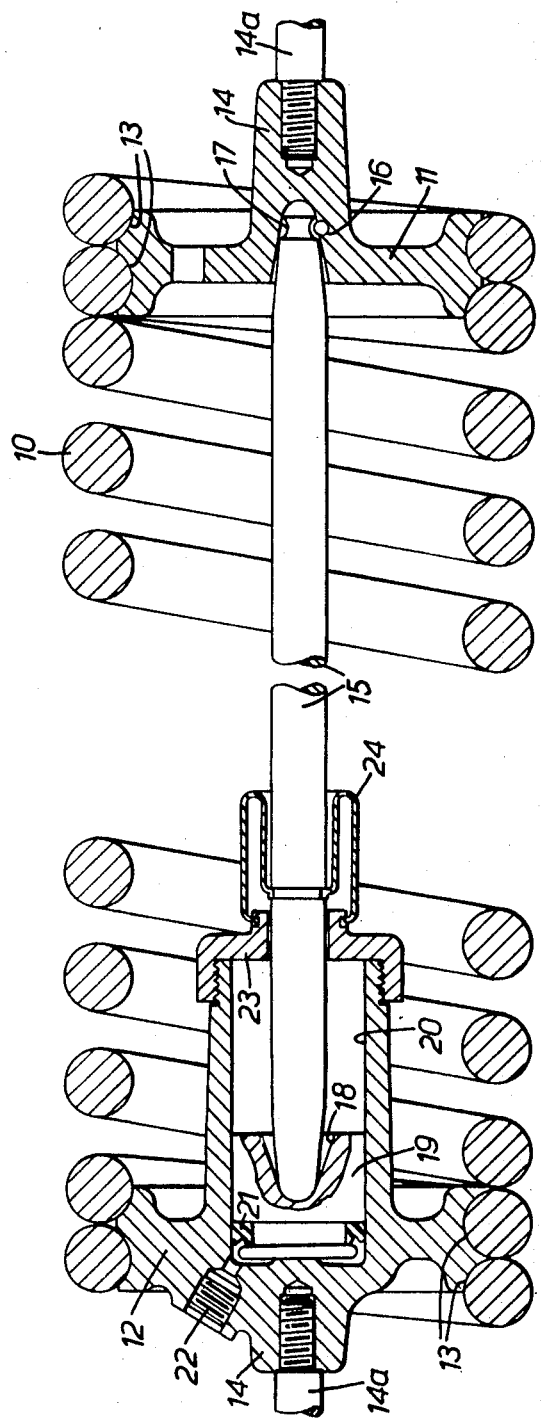
FIG. 1 is a cross-sectional elevation of an actuator unit according to the invention.

The actuator shown in FIG. 1 comprises a coil tension spring 10 extending between two end members 11 and 12. Each of these end members is formed with grooves 13 for anchoring the ends of the spring, and each of the end members is provided with a boss 14; a pair of elongate connecting members 14a for attachment one to each of the drum brakes at opposite sides of the vehicle are secured to the bosses 14. A hold-off strut 15 is mounted coaxially within the spring 10 with one end fastened to the right hand end member 11 by means of a retaining pin 16 seating in a peripheral groove 17 in the strut 15. The other end of the hold-off strut 15 is located in a recess 18 of a piston 19 which is mounted for reciprocation in a cylinder 20 formed in the left hand end member 12. The piston 19 is provided with a seal 21 and operates in response to hydraulic pressure developed in the cylinder 20 by a pressure source which is connected to the cylinder 20 through aperture 22. The cylinder 20 is provided with an end cap 23 and a flexible sheath 24 is connected at one end to the cap 22 and at the other end to the hold-off strut 15 to seal the cylinder against the ingress of dirt. The spring 10 surrounds the piston and cylinder assembly and the longitudinal axes of the spring and the assembly are coaxially arranged.

In operation, hydraulic pressure in the cylinder 20 moves the piston 19 to the right, thereby extending the spring 10 and holding end members 11 and 12 apart against the bias of the spring. The brakes are normally actuated by contraction of the spring 10 as a result of controlled reduction of pressure in the cylinder 20, but are also automatically actuated as a result of pressure failure in the hydraulic system.

Figure 2:
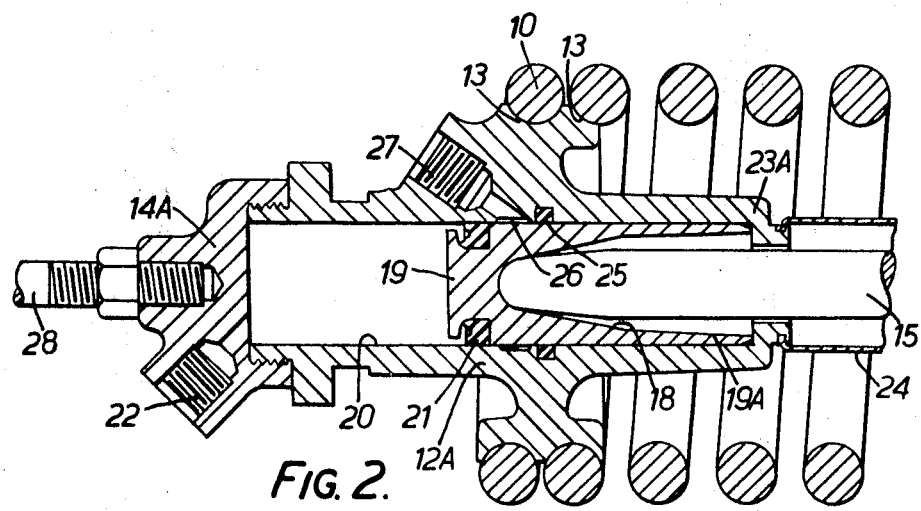
FIG. 2 is a cross-sectional elevation of part of a modified form of the actuator unit shown in FIG. 1.

In the modified construction illustrated in FIG. 2, the cylinder 20 in the left hand end member 12A is provided with a wiper seal 25 and a peripheral groove 26 communicating with a drain aperture 27 for collecting hydraulic fluid escaping past the seal 21. The piston 19 is provided with an extended skirt 19A and the end member 12A is provided with an integral end cap 23A for the cylinder 20 and a separator hub 14A attached to the remainder of the end member 12A by a screw-threaded fastening. The length of the piston 19 and the cylinder are so chosen that the ends of the piston 19 do not pass over the wiper seal 25. As shown in FIG. 2, the hub 14A is fastened directly to a tie rod 28.

Figure 3:
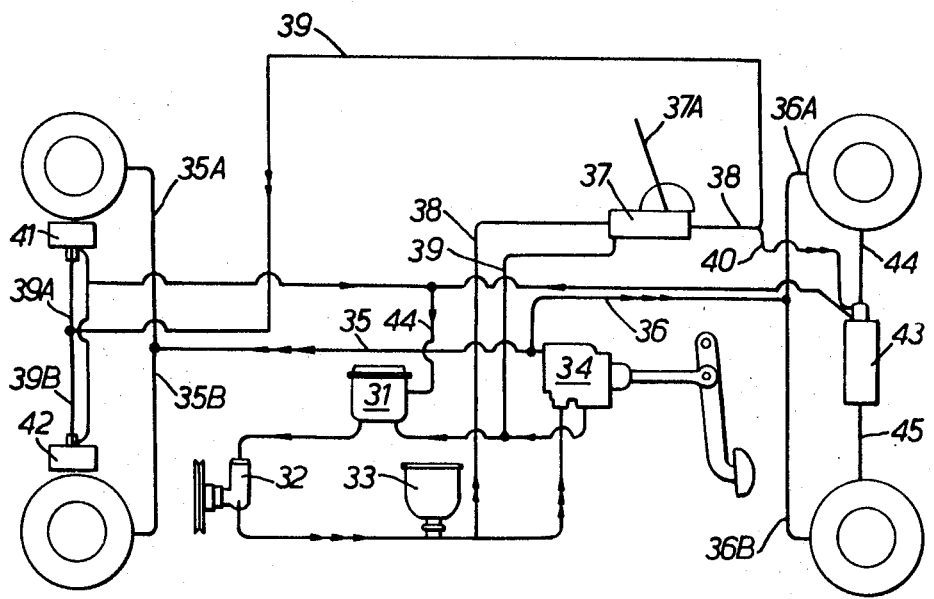
FIG. 3 is a schematic representation of a vehicle braking system incorporating actuator units as shown in FIGS. 1 or 2.

In the hydraulic braking system shown in FIG. 3, hydraulic fluid is supplied from a reservoir 31 through an engine driven pump 32, accumulator 33 and pedal operated control valve 34 to lines 35 and 36 and branch lines 35A, 35B, 36A and 36B leading to the brake cylinders of the four wheels of a vehicle. A further control valve 37, operated by a hand brake lever 37A is connected by supply and discharge lines 38 and 39 to the line between the accumulator 33 and the control valve 34, and to the discharge line between the control valve 34 and the reservoir 31.

Pressure line 38 from the control valve 37 has two branches 39 and 40. The first branch 39 has two further branches 39A and 39B leading to conventional spring operated, hydraulically controlled brake actuator units 41 and 42 for actuating the brakes on the front wheels. The second branch 40 is connected to the cylinder of a brake actuator unit 43 connected to brake expanders by tie rods 44 and 45, as described more fully with reference to FIGS. 1 and 2. The brake cylinders 41 and 42 and the unit 43 all drain leakage fluid to the reservoir 31 through line 44.

On movement of the hand brake lever 37A from its rest position, the hydraulic pressure in brake actuator units 41, 42 and 43 is relieved. This allows the springs in these units to actuate the brakes through suitable expander mechanisms. On return of the hand brake lever 37A to its rest position pressure in the units 41, 42 and 43 equalizes with pressure in the accumulator 33. Thus, if the engine driven pump 32 is operating the springs in units 41, 42 and 43 are over powered and the brakes are released. Of course, when the engine driven pump 32 is not operating the springs of the units 41, 42 and 43 maintain the brakes in the applied condition.

Figure 4:
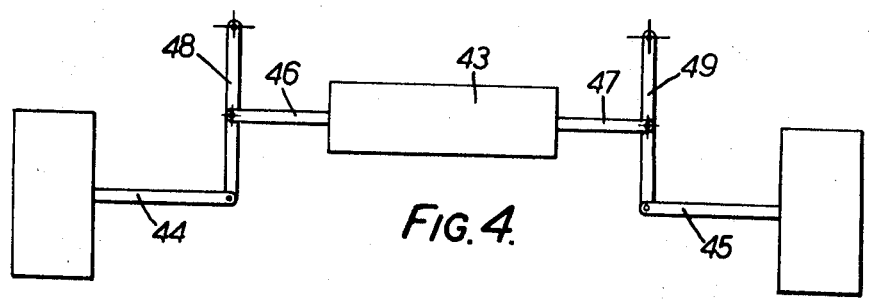
FIG. 4 is a schematic plan view showing the connection between an actuator unit and two brake units on opposite sides of a vehicle.
Figure 5:
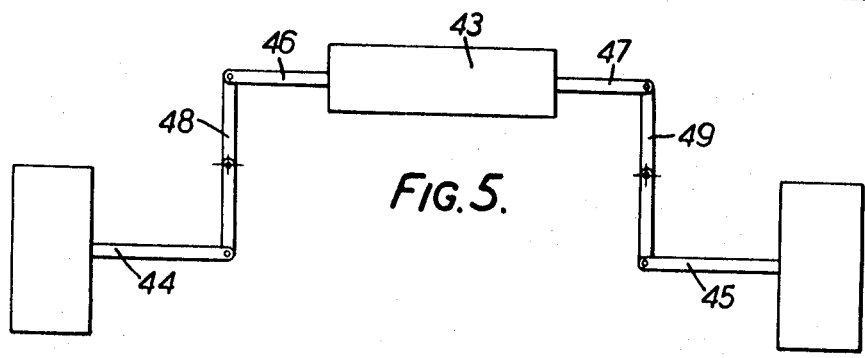
FIG. 5 is a schematic plan view showing the connection between an actuator unit incorporating a compression spring and two brake units on opposite sides of a vehicle.

As shown in FIGS. 4 and 5, the tie rods need not be connected directly to the spring actuator unit, in axial alignment therewith, but may be connneected by a system of levers. In FIG. 4, links 46 and 47 connect opposite ends of the spring actuator unit 43 to levers 48 and 49. One end of each lever 48 and 49 is pivoted to the vehicle frame and the other end is pivotally connected to a tie rod 44 or 45 for controlling a brake expander.

FIG. 5 shows an analogous arrangement for controlling brake expanders by means of a spring actuator unit with a compression spring whereas the links 46 and 47 of FIG. 4 are in tension, the links 46 and 47 of FIG. 5 are in compression.

Each unit described above has the advantages of sturdy construction, facilitated by the fact that it does not require to be positioned close to either wheel, and it provides for balanced braking, since the load bearing parts of the unit are bodily movable, as a unit, to equalize the applied braking effort.

One obvious possible variation from the particular constructions described would be the replacement of the compression coil spring by equivalent spring means, such as an assembly of spring washers (Belville springs).

We claim:

1. Vehicle drum brake actuator unit, comprising a pair of elongated connecting members of attachment one to each of the drum brakes at opposite sides of the vehicle, opposed end members connected one to each of the connecting members, a coil spring extending between and connected to said end members to bias each connecting member in a direction along its length to tend to apply its respective drum brake, and a hydraulic piston and cylinder assembly disposed within the coil spring and operable when hydraulic fluid under pressure is applied thereto to hold said end members against the spring bias to prevent brake actuation and when fluid pressure is released therefrom to allow the spring to bias the members in said direction to actuate their respective drum brakes.

2. A unit according to claim 1, wherein the longitudinal axes of the spring and assembly are coaxial.

3. A unit according to claim 1, wherein the connecting members are defined by tie rods extending in opposite directions.

4. A unit according to claim 1, wherein the spring means is a tension spring.

5. A unit according to claim 1, wherein the piston and cylinder assembly acts when operable to hold said end members apart against the bias of the spring.

6. A unit according to claim 4, wherein the cylinder is provided with a wiper seal and a peripheral groove communicating with a drain aperture, which aperture collects fluid escaping past a seal on the piston.

7. A unit according to claim 1, wherein the coil-spring means is a compression spring.

8. A unit according to claim 7, and including opposed end plates between which the spring extends and acts to tend to bias the plates apart, the plates being held against their bias by said assembly when fluid under pressure is applied thereto.

9. A unit according to claim 8, and including opposed load transmitting members connected one to each of said connecting members and each connected by rods to a respective remote one of said end plates, the piston and cylinder assembly acting when operative to hold the load transmitting members apart.

10. A vehicle braking system including an actuator unit according to claim 1, an hydraulic pump for supplying hydraulic fluid under pressure to said assembly, and a manually operable control valve for relieving the pressure in said assembly.

11. A system according to claim 10, wherein movement of said connecting members is effected through levers pivotally mounted on the vehicle.